United States Patent
Gandham et al.

(10) Patent No.: US 8,059,623 B2
(45) Date of Patent: Nov. 15, 2011

(54) HETEROGENEOUS MAC PROTOCOL FOR MULTIPLE BASE STATIONS IN WIRELESS NETWORKS

(75) Inventors: Shashidhar R. Gandham, Sunrise, FL (US); Amit Shukla, Plantation, FL (US); Hai Vu, Richardson, TX (US)

(73) Assignee: XG Technology, Inc., Sarasota, FL (US)

( * ) Notice: Subject to any disclaimer, the term of this patent is extended or adjusted under 35 U.S.C. 154(b) by 353 days.

(21) Appl. No.: 12/384,546

(22) Filed: Apr. 6, 2009

(65) Prior Publication Data

US 2009/0257415 A1 Oct. 15, 2009

Related U.S. Application Data

(60) Provisional application No. 61/123,888, filed on Apr. 11, 2008.

(51) Int. Cl.
*H04W 84/12* (2009.01)
*H04L 12/66* (2006.01)
(52) U.S. Cl. ........................... 370/338; 370/352

(58) Field of Classification Search .......... 370/310–353; 455/500, 501, 524, 562.1
See application file for complete search history.

(56) References Cited

U.S. PATENT DOCUMENTS

| | | | |
|---|---|---|---|
| 2004/0142695 A1* | 7/2004 | O'Neill et al. | 455/450 |
| 2004/0213191 A1* | 10/2004 | Lee | 370/338 |
| 2004/0218620 A1* | 11/2004 | Palm et al. | 370/445 |
| 2005/0220131 A1* | 10/2005 | Ginzburg et al. | 370/432 |
| 2006/0029073 A1* | 2/2006 | Cervello et al. | 370/389 |
| 2008/0171550 A1* | 7/2008 | Zhao | 455/445 |

* cited by examiner

*Primary Examiner* — Shawki S Ismail
*Assistant Examiner* — Crystal L Hammond
(74) *Attorney, Agent, or Firm* — Dennis L. Cook, Esq.

(57) ABSTRACT

This disclosure describes a new interference avoidance Medium Access Control (MAC) protocol that combines contention-free and contention-based MAC protocols into a heterogeneous MAC protocol used for forwarding VoIP traffic in VoIP systems on wireless networks using multiple base stations which addresses additional interference elimination and the need to transport high bit-rate data to multiple users over wired and wireless means.

3 Claims, 3 Drawing Sheets

Base Station with Three-Sector Antenna

Base Station with Three-Sector Antenna

Figure 2. Hyper-frame structure

Possible Interference

HETEROGENEOUS MAC PROTOCOL FOR MULTIPLE BASE STATIONS IN WIRELESS NETWORKS

CROSS-REFERENCE TO RELATED APPLICATION

The present application claims the benefit of previously filed co-pending Provisional Patent Application, Ser. No. 61/123,888.

FIELD OF THE INVENTION

This invention addresses the need to transport high bit-rate data and voice to multiple users over wired and wireless means. Specifically, this disclosure describes an improved interference avoidance MAC protocol that combines contention-free and contention-based MAC protocols for use in VoIP systems with multiple base stations.

BACKGROUND OF THE INVENTION

The invention disclosed in this application uses any integer cycle or impulse type modulation and more particularly is designed to work with a method of modulation named Tri-State Integer Cycle Modulation (TICM) which has been previously disclosed in U.S. Pat. No. 7,003,047 issued Feb. 21, 2006 and is now known by its commercial designation, xMax. This new wireless physical layer technology developed by xG Technology Inc., referred to as xMAX, enables extremely low power omni-directional transmissions to be received in a wide area Using xMAX, significant bandwidth can be made available for supporting various wireless applications. Voice Over IP (VOIP) based cellular services are now being developed using xMAX. In xMAX-based cellular networks both the base station and the handsets will be equipped with an xMAX transceiver. A mobile device (xMax handset) in such a network will be free to move in an area covered by multiple xMAX base stations. Although this Heterogeneous MAC protocol for multiple base stations is disclosed in the preferred embodiment as being used in these types of integer cycle and pulse modulation systems it can be implemented on any broad band wireless technologies like WiMax, WiBro, WiFi, 3GPP and HSDPA, or any other type of wired or wireless voice or data systems.

A heterogeneous MAC protocol proposed to support VOIP traffic in xMAX wireless networks was described in the pending patent application by one of the inventors of this application, "Heterogeneous MAC Protocol For Forwarding VoIP Traffic On Wireless Networks", U.S. Ser. No. 12/069,057, the contents of which are included herein. In that application guaranteed timeslots are assigned to forward VOIP packets, temporary timeslots are assigned to forward data packets and contention based access is used to exchange control messages. That application described the MAC protocol in the context of a single base station providing metropolitan wide mobile VOIP service. There is a need to deploy multiple base stations such that coverage areas of adjacent base stations overlap. If each of the base stations were to operate independently then multiple concurrent transmissions in adjacent cells might interfere with each other. Hence, in a patent application "Heterogeneous MAC Protocol for Multiple Base Stations in Wireless Networks", U.S. Ser. No. 12/380,698, by the inventors of this application the MAC protocol was modified to support multiple base stations. This application discloses an improved interference avoidance MAC protocol for use in VoIP systems with multiple base stations.

BRIEF SUMMARY OF THE INVENTION

In the first application mentioned above guaranteed timeslots are assigned to forward VOIP packets, temporary timeslots are assigned to forward data packets and contention based access is used to exchange control messages. That application described the MAC protocol in the context of a single base station providing metropolitan wide mobile VOIP service. Though the xMAX signal can propagate significant distances in comparison with other wireless physical layer technologies, a single base station might not be able to cover an entire area of interest. Thus, there is a need to deploy multiple base stations such that coverage areas of adjacent base stations overlap. If each of the base stations were to operate independently then multiple concurrent transmissions in adjacent cells might interfere with each other. Hence, there was a need to modify the MAC protocol to support multiple base stations. Such a modification was described by the inventors of this application in "Heterogeneous MAC Protocol for Multiple Base Stations in a Wireless Network", U.S. Ser. No. 12/380,698, the contents of which are included herein. In that application the inventors identified points where coverage might still be an issue due to interference. In this application an improvement is disclosed to eliminate those points.

DESCRIPTION OF THE DRAWINGS

For a fuller understanding of the nature and objects of the invention, reference should be made to the accompanying drawings, in which.

DETAILED DESCRIPTION OF THE INVENTION

The new wireless physical layer technology developed by xG Technology Inc., referred to as xMAX, enables extremely low power omnidirectional transmissions to be received in a wide area Using xMAX, significant bandwidth can be made available for supporting various wireless applications. Voice Over IP (VOIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations. Although this Heterogeneous MAC protocol for multiple base stations is disclosed in the preferred embodiment as being used in these types of integer cycle and pulse modulation systems it can be implemented on any broad band wireless technologies like WiMax, WiBro, WiFi, 3GPP and HSDPA, or any other type of wired or wireless voice or data systems.

In VOIP-based cellular networks xMAX handsets (or mobile nodes) will be equipped with the complete VOIP stack. The xMAX base station will be connected to the Internet through an Ethernet port. The mobile nodes will communicate with the xMAX base station to reach a VOIP gateway.

Figure 1:
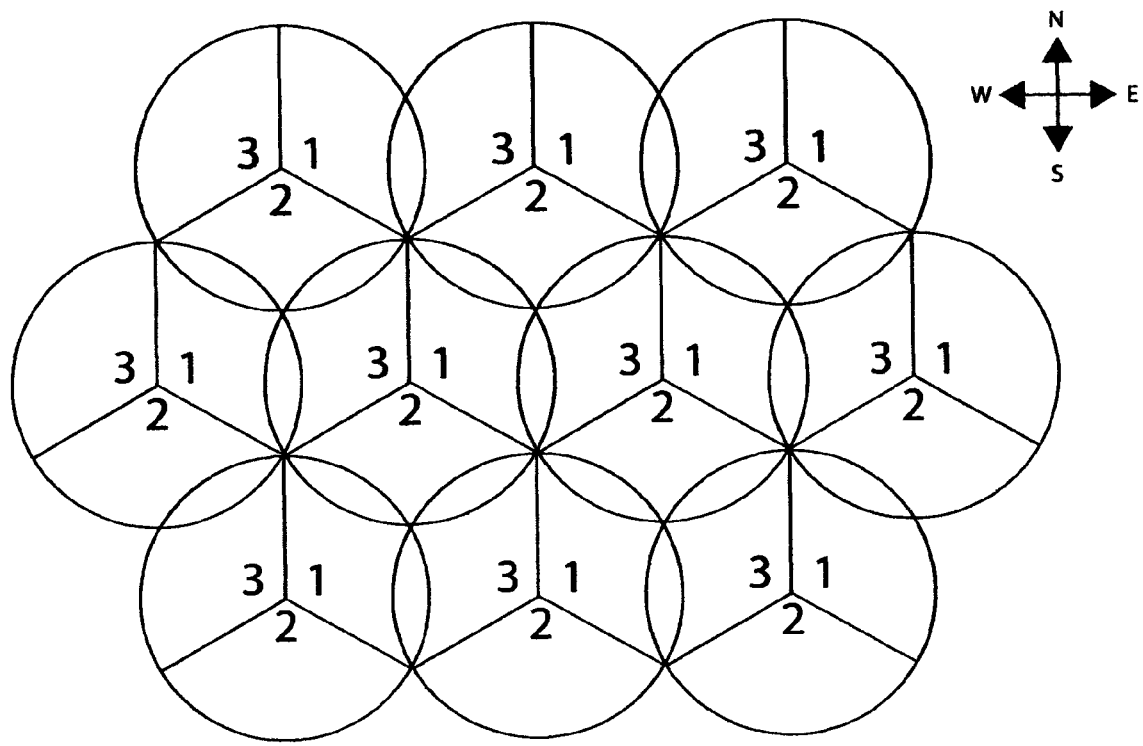
FIG. 1 is a representation of a xMax deployment scenario using multiple base stations with three-sector antennas.

FIG. 1 depicts the deployment scenario with multiple base stations. To enable communication between an xMAX handset and multiple xMAX base stations we need a MAC (Medium Access Control) protocol that is optimized for VOIP traffic as described in the previous application referenced above and that facilitates mobility of the handsets from one base station to another.

As shown in the preferred embodiment of FIG. 1 the reader should consider multiple base stations covering a geographical area. Adjacent base stations' coverage areas overlap in order to eliminate uncovered gaps is the coverage area and facilitate seamlessly mobility of the handsets from one base station to another. Each base station is equipped with a three-sectored antenna with each sector covering 120° in azimuth along with a feasible deployment scenario. The base station locations are carefully planned. In addition, the orientation of the sectors is pre-determined and remains fixed throughout the operational lifetime of the network. Notice that in FIG. 1 the sector orientation is symmetric; i.e., all the sectors with the same number are pointing in the same direction. For example, the first sector of each base station is facing south.

In the preferred embodiment all of the base stations are using the xMAX signal to communicate with handsets in their coverage area. In addition, the communication is carried over the ISM band near 900 MHz. Due to the inherent nature of xMAX signal only one frequency channel is available in the system.

All the base station's clocks are synchronized. Numerous solutions exist for achieving clock synchronization that are well known to those skilled in the art. For example, Network Timing Protocol (NTP) version 3 described in RFC 1305 or Simple Network Timing Protocol (SNTP) described in RFC 2030 can be used. More information on both the protocols can be obtained from www.ntp.org website. GPS is also an option to synchronize the base stations.

Figure 2:
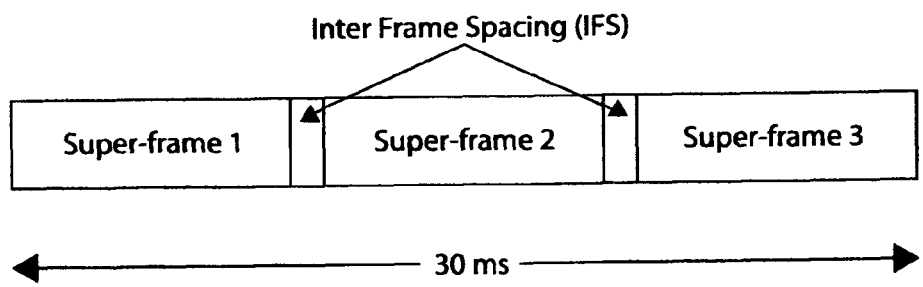
FIG. 2 is a representation of a Hyper-Frame format for the MAC protocol.

The basic idea for using the heterogeneous MAC protocol in a multi-base station deployment involves scheduling all the sectors with the same number concurrently. To accomplish such a schedule the time domain is sliced into equal intervals of time referred to as hyper-frames as shown in FIG. 2. Each hyper-frame is in turn split into multiple super-flames. Adjacent super-flames are separated by a time duration referred to as Inter Frame Spacing (IFS). Duration of the IFS depends on the amount of time it takes to switch between the corresponding sectors of the base stations.

The hyper-frame is a timeframe of 30 ms duration in which the super-frames of all interfering base stations are accommodated. For example, if there are three interfering base stations, then each will adjust their super-frame period to 10 ms to fit the hyper-frame. Note that the hyper-frame duration depends on the codec used and the value of the packetization interval set. For G.723.1 codec with a packetization interval of 30 milli-seconds we use a hyper-frame duration of 30 milli-seconds. If the packetization interval were to be increased to 60 milli-seconds then the hyper-frame duration can be set as 60 milli-seconds. The duration of hyper-frame, duration of super-frames, and the number of super-frames in each hyper-frame is announced in each sector of the base station.

Each sector is numbered as shown in FIG. 1. Note that sectors that are assigned the same numeric value are pointing towards the same direction. For example, all sectors with value of one are pointing in a southern direction. The assignment of a numeric value can be done manually during the network planning phase or can be accomplished by a dynamic distributed algorithm. This value assignment algorithm is outside the scope of the current invention disclosure.

All sectors with an assigned value of one will operate in the first super-frame. Similarly, sectors with assigned value of two (resp. three) will operate-in the second (resp. third) super-frame. In the proposed schedule, sectors 2 and 3 will not operate when sector 1 is operational. In addition, sectors 3 and 1 will not operate when sector 2 is operational. Similarly, sectors 1 and 2 will not operate when sector 3 is operating. Details on how this schedule handles interference in neighboring sectors can be found in "Heterogeneous MAC Protocol for Multiple Base Stations in a Wireless Network", U.S. Ser. No. 12/380,698.

Figure 3:
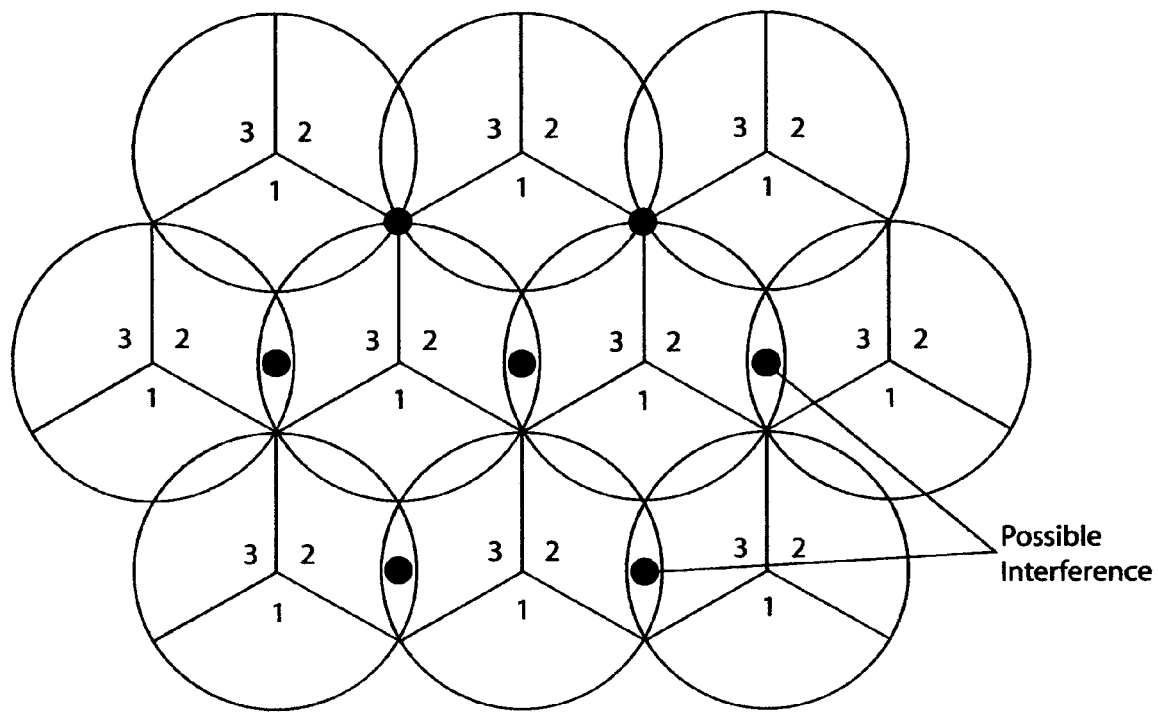
FIG. 3 is a representation of a xMAX deployment scenario of FIG. 1 showing possible interference areas.

In spite of the above scheme handling most of the interference scenarios, there will still be small regions (shown as black dots in FIG. 3), where interference will be possible. The extent of the interference will depend on antenna characteristics, coverage pattern and base station placement, and can only be determined after extensive RF measurements.

Figure 4:
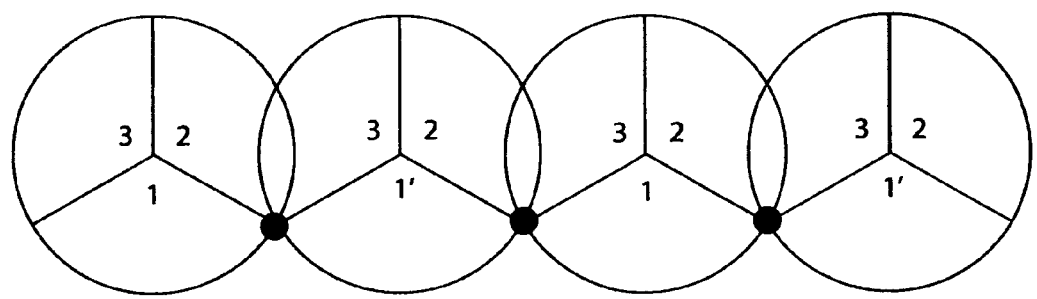
FIG. 4 shows an alternate sector alignment.

Thus what is needed is an alternative hyper-frame structure to handle the interference regions explained in the previous section. To understand the basic concept, let us consider the first sectors in FIG. 4. In the preferred embodiment we distinguish alternative sectors by marking them as Sector-1 and Sector-1'. All the handsets that are in the interference region will be forced to associate with Sector-1. A handset can easily identify that it is in the high interference area if it is able to listen to beacons from multiple sectors. In such a scenario, the handset, if registered with sector 1', will handoff to sector 1.

Figure 5:
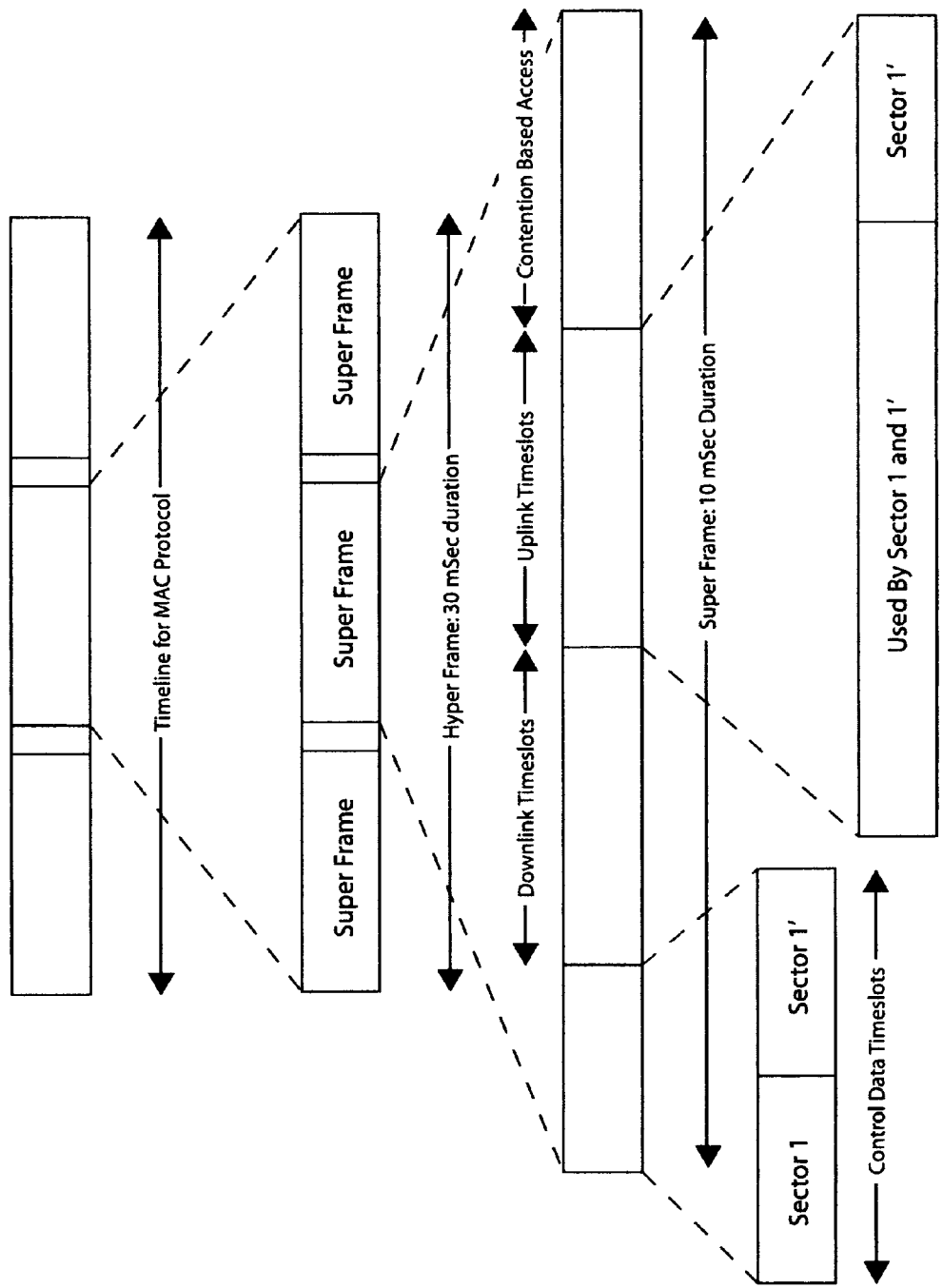
FIG. 5 shows a modified frame structure.

To enable such a system what's needed is the frame structure as shown in FIG. 5. Here, each super-frame is essentially split into two sections. One section caters to the traffic that belongs to either 1 or 1', depending upon which is the native sector, whereas the other section caters only to the handsets in the interference zone. Thus, if a base station is assigned sector 1, it will remain silent during the section meant for sector 1', and if a base station is assigned sector 1' it will be active throughout the super-flame. In other words, sector 1' will serve normal handsets in the first section and it will serve the handsets in the interference region in second section, whereas sector 1 will serve normal traffic in first handsets and keep quiet in the second section. Thus, only one sector is active in the interference region, thereby precluding the possibility of interference.

In this invention disclosure a method to improve coverage in multi base station deployment of xMAX networks was presented. Areas were identified where there could be interference from multiple base stations operating the same super-flame. The super-flame is split into two regions: (1) One wherein both the interfering towers operate concurrently and, (2) the other in which only one tower operates and provides services to handsets that fall in the interference region.

Since certain changes may be made in the above described improved, interference avoiding, MAC protocol that combines contention-free and contention-based MAC protocols for use in VoIP systems with multiple base stations without departing from the scope of the invention herein involved, it is intended that all matter contained in the description thereof or shown in the accompanying figures shall be interpreted as illustrative and not in a limiting sense.

What is claimed is:

1. A medium access control protocol device for interference avoidance in identified interference areas that combines contention-free and contention-based medium access control protocols into a heterogeneous medium access control protocol used for forwarding Internet Protocol packets containing voice traffic, signaling traffic, and application data traffic between multiple base stations and mobile nodes in a voice over internet protocol system on a wireless network having multiple interfering base stations comprising: two or more base stations in electrical communication with the Internet; said two or more base stations each having 360 degree antennas with each of said antennas divided into two or more sectors wherein each of said two or more sectors are separately identified and with each of the said two or more base stations having similarly facing sectors having those similarly facing sectors being similarly identified; wherein when said similarly identified sectors are on adjacent base stations said similarly identified sectors are further sub-identified as prime sub-identified or non-prime sub-identified such that no two prime sub-identified sectors are adjacent and no two non-prime sub-identified sectors are adjacent; said two or more base stations having clocks for synchronization; one or more mobile nodes in wireless electrical communication with said two or more base stations; said two or more base stations and said one or more mobile nodes each having a medium access control protocol; said medium access control protocol having hyper-frames each having a time duration equal to a packetization interval dynamically determined by the duration of the voice traffic in said Internet Protocol packets; said hyper-frames comprised of two or more super-frames of equal durations of time wherein the number of said super-frames is determined by the number of interfering base stations and wherein each of said two or more super-frames is time coordinated with each of said two or more similarly identified sectors of said interfering base stations; each of said two or more super-frames made up of an initial time for contention-free timeslot based access voice traffic and a remainder time for contention-based access signaling traffic and application data traffic; said two or more base stations first dynamically determining a time duration of each of said two or more super-frames and said initial time for contention-free timeslot based access based on the number of said two or more super-frames and the packetization; said initial time for contention-free timeslot based access then being divided into a control data timeslot, a downlink timeslot, and an uplink timeslot wherein the control data timeslot contains information regarding a current super-frame of said two or more super-frames and said one or more mobile nodes are all capable of receiving said information during said control data timeslot in each of said two or more super-frames; said contention-based access then containing control messages transmitted between each of said two or more base stations and said one or more mobile nodes when said one or more mobile nodes join or leave the wireless network or initiate a voice session; said one or more mobile nodes then using carrier sense multiple access with collision avoidance with binary exponential back off contention-based access; wherein said control messages are then assigned a highest priority, said signaling traffic are assigned a lower priority, and said data application messages are assigned a lowest priority; wherein said control data timeslot is then used to transmit messages between each of said two or more base stations and to synchronize said clocks such that all of said similarly identified sectors are scheduled to transmit or receive at the same time; wherein any two adjacent base stations having similarly identified sectors then using the same uplink timeslot and downlink timeslot time duration; and, wherein said super-frame is further divided into prime super-frame and non-prime super-frame and said prime sub-identified sectors of adjacent base stations then operating only during said prime super-frame and said prime sub-identified sectors and non-prime sub-identified sectors of adjacent base stations operate during said non-prime super-frame and said one or more mobile nodes located in identified interference areas detected by said one or more mobile nodes always handing off to said non-prime sub-identified sectors.

2. The medium access control protocol device of claim 1 wherein a limit is set on the number of said Internet Protocol packets for each of said one or more mobile nodes such that if the number of said Internet Protocol packets to be sent by one of said two or more base stations to said one or more mobile nodes exceeds the limit the base station will drop one or more of said Internet Protocol packets.

3. The medium access control protocol device of claim 1 wherein said Internet Protocol packets contain a time stamp and are sorted by each of said two or more base stations according to said time stamp and then sent to said one or more mobile nodes in accordance with said time stamp such that said Internet Protocol packet with the earliest time stamp is sent before later time stamped Internet Protocol packets.

* * * * *